United States Patent [19]

Albonico et al.

[11] Patent Number: 5,441,928
[45] Date of Patent: Aug. 15, 1995

[54] AQUEOUS GELLABLE COMPOSITION CONTAINING AN ANTI-SYNERESIS AGENT

[75] Inventors: Paola Albonico, Milan; Thomas P. Lockhart, Lodi, both of Italy

[73] Assignees: Eniricerche S.p.A.; AGIP S.p.A., both of Milan, Italy

[21] Appl. No.: 981,761

[22] Filed: Nov. 25, 1992

[30] Foreign Application Priority Data

Nov. 26, 1991 [IT] Italy .............................. MI91A03151
Dec. 6, 1991 [IT] Italy .............................. MI91A03275
Feb. 6, 1992 [IT] Italy ................................ MI92A0230

[51] Int. Cl.$^6$ ............................................ E21B 33/00
[52] U.S. Cl. .................................... 507/225; 507/236;
507/239; 507/247; 507/263; 507/264; 507/268;
507/935; 523/130
[58] Field of Search ...................... 252/8.551; 523/130;
524/124, 130, 238, 291, 296, 320, 321; 507/225,
236, 237, 247, 239, 263, 264, 268, 935

[56] References Cited

U.S. PATENT DOCUMENTS

| | | |
|---|---|---|
| 3,421,584 | 1/1969 | Eilers et al. . |
| 3,795,276 | 3/1974 | Eilers et al. . |
| 4,069,869 | 1/1978 | Sandiford . |
| 4,485,875 | 12/1984 | Falk . |
| 4,487,867 | 12/1984 | Almond et al. . |
| 4,799,548 | 1/1989 | Mumallah et al. . |
| 4,974,677 | 12/1990 | Shu . |
| 4,994,194 | 2/1991 | Moradi-Araghi . |
| 5,028,344 | 7/1991 | Hoskin . |
| 5,186,847 | 2/1993 | Cole et al. . |

FOREIGN PATENT DOCUMENTS

| | | | |
|---|---|---|---|
| 0142407 | 10/1984 | European Pat. Off. . | |
| 0383337 | 2/1990 | European Pat. Off. | ..... E21B 33/138 |
| 0390137 | 3/1990 | European Pat. Off. . | |
| 0390279 | 3/1990 | European Pat. Off. . | |
| 2187773 | 1/1987 | United Kingdom | ....... E21B 33/138 |

OTHER PUBLICATIONS

A. Moradi-Araghi and P. H. Doe, *Stability of Polyacrylamides in Hard Brines at Elevated Temperatures*, presented at 59th Annual Technical Conference and Exhibition held in Houston, Texas, Sep. 16–19, 1984.

P. H. Doe, A. Moradi-Araghi, J. E. Shaw and G. A. Stahl, *Development and Evaluation of EOR Polymers Suitable for Hostile Environments: Copolymers of Vinylpyrrolidone and Acrylamide,* presented at the 60th Annual Technical Conference and Exhibition of the Society of Petroleum Engineers held in Las Vegas, Nev., Sep. 22–25, 1985.

*Primary Examiner*—Gary L. Geist
*Assistant Examiner*—Joseph D. Anthony
*Attorney, Agent, or Firm*—Rogers & Wells

[57] ABSTRACT

An aqueous gellable composition capable of producing gels resistant to syneresis in the presence of divalent ions, contains:
- a water-soluble acrylamide polymer or copolymer,
- a crosslinking agent formed by a water-soluble aldehyde, or a water-soluble aldehyde and a water-soluble phenol,
- a water-soluble anti-syneresis agent selected from: organic carboxy acids, organic hydroxy acids and aminoacids, or among aminophosphonic acids and their alkali-metal or ammonium salts.

When malonic acid is used, a delay in aqueous composition gelation is additionally obtained.

16 Claims, No Drawings

AQUEOUS GELLABLE COMPOSITION CONTAINING AN ANTI-SYNERESIS AGENT

The present invention relates to an aqueous gellable composition capable of producing gels resistant to syneresis in the presence of divalent ions, and to its use the sector of assisted oil (petroleum) recovery.

It is well-known that at the end of the step of primary recovery of oil from an oil field, which primary recovery is accomplished by exploiting the natural energy stored in the oil reservoir, or by means of mechanical energy, inside the oil field still a large amount of oil remains. Therefore, in order to increase the amount of oil which can be extracted, techniques of secondary recovery are customarily used, which essentially consist in injecting into the oil field a liquid medium, which generally is water or an aqueous polymeric solution, or a gas, such as carbon dioxide or steam, which performs the task of conveying the oil to the production well. Unfortunately, owing to the lack of homogeneity in the oil-bearing rock, which is constituted by zones with different permeability characteristics, such fluid means tend to preferentially flow through higher-permeability zones.

On the contrary, the lower-permeability zones remains non-fluxed or are only partially fluxed, and such a drawback prevents the oil contained in the latter from being further extracted.

A solution proposed in the past in order to solve such a problem, consists in modifying the permeability of the oil field by either completely or partially occluding the high-permeability zones, so that the flow of the fluid means, which will be injected into the oil field at a later time in order to recover oil, can be diverted to flow through the low-permeability zones. For that purpose, into the oil field an aqueous solution can be injected of a gellable polymer, capable of being turned into a gel by means of a multivalent metal ion, so as to form polymeric gels in situ.

Inasmuch as the zones to be occluded may be very large and/or at a long distance from the injection well it may be necessary that the formation of the gel takes place after a delay time, so as to allow the gellable solution to reach the desired zone and fill it to a complete, or substantially complete, extent.

Therefore, the use was proposed in the art of aqueous gellable compositions, either containing, or devoid of, divalent ions, with a more or less delayed gelation time, as a function of the site of use thereof being close to, or far away from, the injection well, which compositions are generally constituted by a crosslinkable polymer, e.g., a polyacrylamide, a multivalent metal ion and a bonding agent, or a sequestering agent for said multivalent metal ion, such as disclosed, e.g., in U.K. patent application 2,187,773 and in U.S. Pat. No. 4,917,186.

Another gelation technique known from the prior art uses, as crosslinking agents, a phenol or a substituted phenol, and an aldehyde, as disclosed in U.S. Pat. Nos. 4,485,875 and 4,994,194. However, it was observed that the gels obtained in that way are poorly stable, in particular in the presence of divalent ions, in particular calcium and magnesium ions, because phenomena of syneresis occur—i.e., phenomena of spontaneous separation of the liquid medium from the gel, owing to same gel shrinking. Said syneresis is started as a consequence of the hydrolysis of the amidic groups contained in polymers based on acrylamide (SPE Paper 13,033 by A. Moradi-Araghi and SPE 14,233 by P. H. Doe, A. Moradi-Araghi, J. E. Shaw and G. A. Stahl). The carboxy groups formed as a consequence of said hydrolysis interact with divalent ions causing, in case of polymeric solutions, the polymer to precipitate; and, in case of polymeric gels, syneresis to occur. As a consequence, the life and consequently the usefulness of gels formed practical use conditions, are reduced.

A deeply studied way to reduce the strong propensity of polyacrylamide to undergo syneresis at temperature higher than 60° C., in the presence of divalent ions, is incorporating into the polymer hydrolysis resistant comonomers, as reported by P. H. Doe et al., loc.cit. Examples of useful comonomers for that purpose are N-vinyl-pyrrolidone and 2-acrylamido2-methylpropane-sulfonate. In practice, it was observed that the reduction of sensibility of gels to divalent metal ions depends on the amount of comonomer introduced into the acrylamide copolymer. However, the use of large amounts of comonomer is hindered by such factors as the high cost of the comonomer, and the difficulties met in producing copolymers having a high enough molecular weight, to be practically useful for forming the gels. In fact, thus far, only a few copolymers of such a type have become available on the market.

The present Applicant found now, according to the present invention, that some low-cost agents, which are sequestering agents for divalent ions, display an anti-syneresis effect on the gels obtained from the aqueous compositions of acrylamide polymers and copolymers gelled with an aldehyde, or with an aldehyde and a phenol. Therefore, according to the present invention, it results it possible the threshold temperature of use of polyacrylamides and of relevant copolymers in gellable compositions, with delayed or non-delayed gelation time, to be increased, additionally with a general improvement of the characteristics of the resulting gels.

It has also been found that malonic acid not only acts as anti-syneresis agent, but also as an agent with an unespectedly high activity in delaying the gelation of the aqueous compositions into which it is incorporated.

In accordance therewith, the present invention relates to an aqueous gellable composition capable of producing gels resistant to syneresis in the presence of divalent ions, containing:

a water-soluble acrylamide polymer or copolymer, a crosslinking agent formed by a water-soluble aldehyde, or a water-soluble phenol and a water-soluble aldehyde, a water-soluble anti-syneresis agent selected from among (i) aminophosphonic acids, or from among (ii) organic carboxy acids, organic hydroxy acids and aminoacids.

Examples of anti-syneresis agents (i) suitable for the stated purpose, are:

amino-monoalkylene-phosphonic acids, such as amino-methylene-phosphonic acid:

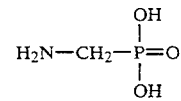

amino-bis(alkylene-phosphonic) acids, such as amino-bis(methylene-phosphonic) acid:

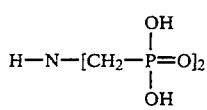

amino-tris(alkylene-phosphonic) acids, such as amino-tris(methylene-phosphonic) acid:

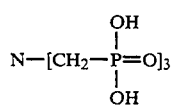

polyamino-poly(alkylene-phosphonic) acids, such as triamino-penta (methylene-phosphonic) acid:

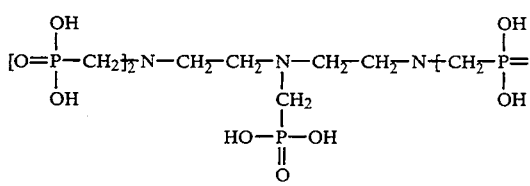

Said amino-alkylene-phosphonic acids can be used as such, or in a partially or completely salified form, particular as sodium salts.

The amino-phosphonic acids are used in the art as anti-fouling inhibitor agents (SPE Paper 217,149), or in order to stabilize drilling muds at temperatures lower than 90° C. (SPE Textbook Series, Volume 2, Chapter 2). However, the present Applicant found now that by using amino-phosphonic acids, perfectly clear polymeric solutions can be obtained with highly hydrolysed polyacrylamides in synthetic sea water, within a wider pH range than obtainable in the absence of such an additive. The present Applicant could furthermore find that these compounds perfom an anti-syneresis action on the gels obtained from the aqueous compositions, containing divalent ions, of acrylamide polymers and copolymers gelled with an aldehyde, or an aldehyde and a phenol.

Among the anti-syneresis agents (ii), the aliphatic alpha-hydroxy acids, aliphatic alpha-dicarboxy acids and the aliphatic di- or poly-carboxy acids containing from 3 to 6 carbon atoms are preferred, in which a hydrogen atom on carbon atom in alpha- or beta-position is replaced by a hydroxy radical. Specific examples of anti-syneresis agents are: acetic acid, salicylic acid, ascorbic acid, lactic acid, glycolic acid, maleic acid, glycine, adipic acid, succinic acid, phthalic acid, glutaric acid, citric acid, tartaric acid, gluconic acid and oxalic acid.

In particular, the desired effect of anti-syneresis agents (i) and (ii) manifests itself with a concentration of the same agent, in the gellable composition, corresponding to a ratio of the moles of anti-syneresis agent to the divalent ions, in particular calcium and magnesium, of from 0.2 to 10 and preferably of the order of 0.4–4. On considering the water generally used in the preparation of the composition (sea wager or water coming from the same reservoir), those values generally correspond to a molar concentration of anti-syneresis agent comprised within the range of from 0.05 M to 0.5 M.

As it was previously stated, the anti-syneresis agent is capable of sequestering the divalent ions present in the gellable compositions, in particular calcium and magnesium ions, preventing the precipitation of acrylamide polymer and consequently making it possible a polymer solution to exist within an extended pH range. Thus, the pH range of gelation of the same compositions results to be extended. For example, a mixture constituted by 5,000 ppm of a polyacrylamide with a high hydrolysis degree (a commercial product manufactured by the Company Aldrich; molecular weight 200,000) in synthetic sea water, at its natural pH (8.4) is cloudy, owing to the insolubility of the highly hydrolysed polymer in the presence of divalent ions. Such a solution turns into a completely clear one only at pH values of from 3.75 to 5.5. In the presence of binders at a concentration of 0.1 M, one may obtain the solubilization at pH values higher than 5.5, up to a maximal pH value which depends on the particular binder used, as it can be seen from the table reported hereinunder.

| Binder | Solubility pH range |
| --- | --- |
| Acetic acid | 3.5–5.8 |
| Salicylic acid | 3.7–5.8 |
| Ascorbic acid | 3.7–6.3 |
| Lactic acid | 3.7–9.1 |
| Glycolic acid | 3.6–9.6 |
| Maleic acid | 4.7–9.7 |
| Glycine | 3.7–9.8 |
| Adipic acid | 3.6–9.8 |
| Succinic acid | 3.7–9.8 |
| Phthalic acid | 3.8–10 |
| Glutaric acid | 3.7–10.4 |
| Citric acid | 3.6–12.7 |
| Tartaric acid | 3.6–13.6 |
| Gluconic acid | 3.6–13.6 |
| Oxalic acid | 2.0–13 |

Furthermore, a mixture constituted by 5,000 ppm of a highly hydrolysed polyacrylamide (a commercial product, manufactured by the company Aldrich; molecular weight 200,000) in synthetic sea water, at its natural pH (8.4) is cloudy, owing to the insolubility of the highly hydrolysed polymer in the presence of the divalent ions. Such a solution turns into a completely clear one at pH values of from 3.75 to 5.5. In the presence of diethylene-triamino-penta(methylene phosphonic) acid, in an amount of 0.5% by weight, polyacrylamide can be dissolved in synthetic sea water at pH values which may range from 3.75 up to 11, or even higher. The resulting perfectly clear solutions are stable up to temperatures of 120° C. or more. Such a result indicates that diethylene-triamino-penta(methylene phosphonic) acid is capable of complexing the divalent ions, forming a soluble complex. The removal of the divalent ions obtained in that way enables the poly-acrylamide, also highly hydrolysed, to remain in solution in synthetic sea water.

According to a preferred form of practical embodiment of the present invention, malonic acid is used as an agent capable of delaying gelation and of counteracting the syneresis of the gel obtained from the same compositions. In particular, these desired effects manifest themselves when the molar concentration of malonic acid in the gellable composition is kept comprised within the range of from 0.01 M to 0.5 M, and preferably of from 0.01 to 0.2 M. These values generally correspond to a molar ratio of phenol to malonic acid comprised within the range of from 6.4:1 to 0.1:1 and preferably of from 6.4:1 to 0.3:1 and to a ratio of the aldehyde to said malonic acid comprised within the range of from 200:1 to 4:1 and preferably of from 200:1 to 10:1.

The acrylamide polymers useful for that purpose are acrylamide homopolymers and acrylamide copolymers with one or more unsaturated copolymerizable monomers such as, e.g., acrylic acid, methacrylamide, sodium 2-acrylamido-2-methyl-propanesulfonate and N-vinyl-2-pyrrolidone. Among the copolymers, copolymers of acrylamide with sodium 2-acrylamido-2-methyl-propanesulfonate, copolymers of acrylamide with N-vinyl-2-pyrrolidone and terpolymers of acrylamide with sodium 2-acrylamido-2-methyl-propane-sulfonate and N-vinyl-2-pyrrolidone, are preferred.

The (co)polymers of acrylamide can be substantially non-hydrolysed (less than 1% of amidic groups are hydrolysed to yield carboxy groups), or partially hydrolysed (more than 1% of amidic groups are hydrolysed to yield carboxy groups). Preferably, acrylamide (co)polymers with a hydrolysis degree of the order of 1–67%, or copolymers of acrylamide with acrylic acid are used.

The molecular weight of these acrylamide (co)-polymers can generally be comprised within the range of from 100,000 to 20,000,000 and preferably within the range of from 200,000 to 12,000,000.

The concentration of acrylamide (co)polymer in the gellable composition according to the present invention can generally be comprised within the range of from 1,000 to 50,000 ppm (parts per million parts by weight); it will be preferably comprised within the range of from 3,000 to 30,000 ppm, and, in the most preferred form, of from 5,000 to 10,000 ppm in the case of use of fresh water; and of from 15,000 to 30,000 ppm in case of salt water (for example, sea water).

The crosslinking agent used in the composition of the present invention is formed by a water-soluble aldehyde, or a water-soluble aldehyde and a water-soluble phenol.

The aldehyde is advantageously selected from the group consisting of monoaldehydes or dialdehydes, such as formaldehyde, trioxane, paraformaldehyde, acetaldehyde, propionaldehyde, butyric aldehyde, iso-butyric aldehyde, valerie aldehyde, heptaldehyde, decanal, glyoxal, glutaric aldehyde and terephthalaldehyde. According to the preferred form of practical embodiment, formaldehyde or compounds capable of releasing formaldehyde will be used. The amount of aldehyde in the composition can be comprised within the range of from 100 to 20,000 ppm, and preferably will be of from 400 to 10,000 ppm.

In the preferred form of practical embodiment, the crosslinking agent will be constituted by an aldehyde, selected from among those as reported hereinabove, and by a phenol, which will be advantageously selected from mono-hydroxy or di-hydroxy phenols, such as phenol, catechol, resorcinol, phloroglucinol, pyrogallol, 4,4'-diphenol, 1,3-dihydroxynaphthalene and salicylic acid esters and amides. Phenol is preferred. The amount of phenol contained in the composition according to the present invention can range from 300 to 12,000 ppm (parts per million parts by weight), and preferably will be of the order of 400–10,000 ppm. The molar ratio of the aldehyde to the phenol will be comprised within the range of from 0.01:1 to 25:1 and preferably will be comprised within the range of from 0.5:1 to 6:1.

In any cases, the selection of the aldehyde, or of the aldehyde and phenol, of their concentration in the solution and of their ratio, within the above reported ranges, will be dictated by considerations as to the desired rate of gelation and as to the physical properties of the gels for the specific environmental conditions in which the gelation is due to take place.

The gellable composition can finally contain one or more stabilizing agent(s) for the polymer, selected from those customarily used for that purpose, such as, e.g., thiourea.

The aqueous gellable composition of the present invention can be prepared by simply mixing the components thereof, on considering that the addition sequence is not particularly critical. However, if a substantially hydrolysed acrylamide polymer and divalent-ion-containing water are used, adding to water the anti-syneresis agent and subsequently the hydrolysed polymer, may result to be advantageous. In the preparation of the composition, salt-containing water can be used, such as, e.g., sea water or water from the same oil field, as well as salt-free water.

According to a further aspect thereof, the present invention relates to the use of the above disclosed gellable composition in assisted oil recovery operations, or in other known operations, such as in the reduction of permeability in zones of an oil field, in the isolation of zones of the oil field, and in such known operations such as water shut-off, water coning, gas coning and well shut-in.

In particular, in the use in order to reduce the permeability of zones of an oil field, the process is carried out by:
a) preparing the aqueous gellable composition having the characteristics disclosed hereinabove;
b) injecting the composition into the oil field, through at least one well;
c) causing the composition to flow through the oil field, until said composition reaches, and substantially fills, the high-permeability zone which one wishes to treat; and
d) allowing said composition to turn into a gel, with the permeability of the same zone being consequently reduced.

The composition of the present invention will have a more or less delayed gelation time, adjustable as a function of the specific components used for the preparation thereof, of the relative ratio of said components to each other, and of the environmental conditions, in particular the temperature, at which the gelation takes place. The best results, as regards the gelation delay, are obtained by means the use of malonic acids, as indicated above.

According to an advantageous form of practical embodiment, the gellable composition according to the present invention is used in order to reduce the permeability of high-permeability zones situated in depth in the oil field, in which the temperature is much higher, or anyway situated far away from the injection well, without that an early gelation takes place.

The composition of the present invention turns into a gel with useful delay times within a wide range of temperatures, e.g., from 70° C. to 150° C. In any cases, the gels obtained show unexpected characteristics of resistance to syneresis, as it will be clear from the following, non-limitative experimental examples.

EXAMPLE 1

Aqueous gellable compositions are prepared by mixing:
synthetic sea water;
10,000 ppm of a copolymer of acrylamide and sodium 2-acrylamido-2-methyl-1-propanesulfonate in a weight ratio of approximately 72:25, with a weight average molecular weight of from 1 to $3.10^6$, containing about 4% of amidic groups hydrolysed to yield carboxy groups (a commercial product supplied by the Company Drilling Specialties);

5,000 ppm of thiourea;

6,000 ppm of phenol;

6,000 ppm of formaldehyde; and variable amounts of anti-syneresis agent diethylene-triamino-penta(methylene-phosphonic) acid, or of said acid in a partially salified form (sodium salt).

The compositions are adjusted at a pH value of 5±0.1 and are submitted to gelation in an oven at 120° C.

For comparison purposes, a composition similar to the above, but not containing the anti-syneresis agent, is prepared and gelled. The resulting gels are maintained at 120° C., and the percent syneresis development is monitored over time. The data reported in the following Table 1 relates to the use of diethylene-triamino-penta(methylene-phosphonic) acid, and the data reported in Table 2 relates to the use of the same acid, in a partially salified form with sodium.

TABLE 1

| Time (days) | Concentration of anti-syneresis agent (% by weight) | | | |
|---|---|---|---|---|
| | 0% | 0.5% | 1% | 3% |
| 1 | 5% | stable | stable | stable |
| 5 | 30% | stable | stable | stable |
| 7 | 40% | 5% | stable | stable |
| 8 | 40% | 20% | stable | stable |
| 11 | 60% | 40% | 5% | stable |
| 13 | 70% | 50-60% | 10% | stable |
| 20 | 90% | 80% | 50% | stable |
| 50 | — | 90% | 80% | stable |

TABLE 2

| Time (days) | Concentration of anti-syneresis agent (% by weight) | | | | |
|---|---|---|---|---|---|
| | 0% | 0.5% | 1% | 3% | 5% |
| 1 | 5% | stable | stable | stable | stable |
| 5 | 30% | 5% | stable | stable | stable |
| 8 | 40% | 20-30% | <5% | stable | stable |
| 11 | 60% | 40% | 30% | stable | stable |
| 13 | 70% | 70% | 50% | <5% | stable |
| 20 | 90% | 80% | 60% | 5% | stable |
| 50 | — | 90% | 80% | 10% | 5% |

EXAMPLE 2

Aqueous gellable compositions are prepared by mixing:

synthetic sea water;

20,000 ppm of a copolymer of acrylamide and sodium 2-acrylamido-2-methyl-1-propanesulfonate in a weight ratio of approximately 72:25, with a weight average molecular weight of from 1 to $3.10^6$, containing about 4% of amidic groups hydrolysed to yield carboxy groups (a commercial product supplied by the Company Drilling Specialties);

5,000 ppm of thiourea;

6,000 ppm of phenol;

6,000 ppm of formaldehyde; and variable amounts of anti-syneresis agent glycolic acid, citric acid or oxalic acid.

The compositions are adjusted at a pH value of 5±0.1 and are submitted to gelation in an oven at 120° C.

For comparison purposes, a composition similar to the above, but not containing the anti-syneresis agent, is prepared and gelled. The resulting gels are maintained at 120° C., and the percent syneresis development is monitored over time. The results are reported in the following Table 3.

TABLE 3

| Time (days) | Anti-syneresis agent | | | | |
|---|---|---|---|---|---|
| | Glygolic ac. | | Citric ac. | Oxalic ac. | None |
| | 0.1 M | 0.3 M | 0.1 M | 0.1 M | |
| 5 | 5-10% | stable | stable | stable | 20% |
| 10 | 20% | 5-10% | stable | stable | 30% |
| 15 | 40-50% | 30% | stable | stable | 50% |
| 20 | 70-80% | 60% | stable | stable | 90% |
| 30 | 90% | 90% | stable | stable | — |
| 90 | — | — | stable | <5% | — |

EXAMPLE 3

Aqueous gellable compositions are prepared by mixing:

synthetic sea water;

10,000 ppm of an acrylamide polymer having a hydrolysis degree of 7.5%;

6,000 ppm of phenol;

6,000 ppm of formaldehyde; and variable amounts of anti-syneresis agent glycolic acid or citric acid.

The compositions are adjusted at a pH value of 5±0.1 and are submitted to gelation in an oven at 90° C.

For comparison purposes, a composition similar to the above, but not containing the anti-syneresis agent, is prepared and gelled. The resulting gels are maintained at 90° C., and the percent syneresis development is monitored over time. The results are reported in the following Table 4.

TABLE 4

| Time (days) | Anti-syneresis agent | | | | |
|---|---|---|---|---|---|
| | Glycolic acid | | Citric acid | | None |
| | 0.1 M | 0.3 M | 0.1 M | 0.3 M | |
| 8 | <5% | stable | stable | stable | 5% |
| 13 | 30% | 20% | <5% | stable | 40% |
| 21 | 40-50% | 40% | 10% | stable | 50% |
| 60 | 60% | 40% | 10% | 5% | 80% |
| 90 | 70% | 40% | 10% | 10% | 90% |

Example 4

Aqueous gellable compositions are prepared by mixing:

synthetic sea water;

20,000 ppm of a copolymer of acrylamide and sodium 2-acrylamido-2-methyl-1-propanesulfonate in a weight ratio of approximately 72:25, with a weight average molecular weight of from 1 to $3.10^6$, containing about 4% of amidic groups hydrolysed to yield carboxy groups (a commercial product supplied by the Company Drilling Specialties);

5,000 ppm of thiourea;

6,000 ppm of phenol;

6,000 ppm of formaldehyde; and malonic acid in the molar concentrations (M) and in the molar ratio of phenol to malonic acid (R) and of formaldehyde to malonic acid as reported in the following Table 5.

The compositions are adjusted at a pH value of 5±0.1 and are submitted to gelation in an oven at 120° C.

The gels obtained in that way are stored at 120° C., and the values of:

gelation time (T gel);
Elastic modulus of the gel (G'), expressed as Pa;
pH value of gel (pH); and
stability of gel to syneresis (stab.), defined as the time at which the syneresis phenomenon starts are measured.

These results are reported in the following Table 5.

TABLE 5

| Malonic ac. | R | R' | T gel | G' | pH | stab. |
|---|---|---|---|---|---|---|
| 0 M (*) | — | — | 5 hrs. | 99 | 6.25 | 7 days |
| 0.025 M | 2.56 | 80 | 5/23 hrs. | 122 | 5.92 | 19/34 days |
| 0.075 M | 0.85 | 26.7 | 5/23 hrs. | 143 | 6.03 | >2.5 months |
| 0.1 M | 0.64 | 20 | 4–7 days | 143 | 5.85 | >2.5 months |
| 0.15 M | 0.42 | 13.3 | 7–8 days | nd | nd | nd |
| 0.2 M | 0.32 | 10 | 8–11 days | nd | nd | nd |
| 0.3 M | 0.21 | 6,7 | no gel | — | — | — | nd = Not determined;
(*) in this sample, not containing malonic acid, syneresis is of more than 90% after 25 days.

The data reported in Table 5 sets forth the gelation delaying effect of malonic acid, and the anti-syneresis effect of the latter on the resulting gels.

This data also evidences that the results are not due to a simple pH effect, not even to a subtraction or modification of phenol or of formaldehyde by malonate.

EXAMPLE 5 (COMPARISON EXAMPLE)

An aqueous gellable composition similar to the composition of Example 4 is prepared, without phenol.

The gelation behaviour of said composition in the absence and in the presence of malonic acid is reported in the following Table 6.

TABLE 6

| Crosslinker | Concentrated malonic ac. | pH | Gelation time |
|---|---|---|---|
| Formaldehyde | 0 M | 5,55 | 5–21 hours |
| Formaldehyde | 0.05 M | 8.19 | 21–45 hours |
| Formaldehyde | 0.1 M | 8.36 | 6–9 days |

The data reported in Table 6 evidence a delaying effect on gelation which however could be at least partially attributable to the change in pH value which occurs during gelation.

EXAMPLE 6 (COMPARISON EXAMPLE)

An aqueous gellable composition similar to the composition of Example 4 is prepared, but without formaldehyde.

No gelation is obtained either in the absence or in the presence of malonic acid.

We claim:

1. An aqueous gellable composition capable of producing gels resistant to syneresis in the presence of divalent ions, the composition comprising:
   water;
   a water-soluble acrylamide polymer or copolymer;
   a water-soluble aldehyde or a combination of a water-soluble phenol and the water-soluble aldehyde as a crosslinking agent; and
   a water-soluble acid, as an anti-syneresis agent, which is an amino acid.

2. A composition according to claim 1, further comprising, both as an anti-syneresis agent and a gellation-delaying agent, malonic acid present in a molar concentration of from 0.01M to 0.5M; wherein the crosslinking agent is the combination of the water-soluble phenol and the water-soluble aldehyde; wherein a molar ratio of the phenol to the malonic acid is from 6.4:1 to 0.1:1; and wherein the molar ratio of the aldehyde to the malonic acid is from 200:1 to 4:1.

3. A composition according to claim 1, wherein the amino acid anti-syneresis agent is an amino-phosphonic acid and is selected from the group consisting of:
   an amino-mono(alkylene-phosphonic) acid,
   an amino-bis(alkylene-phosphonic) acid,
   an amino-tris(alkylene-phosphonic) acid, and
   a polyamino-poly(alkylene-phosphonic) acid.

4. A composition according to claim 3, wherein the water contains divalent ions and the divalent ions are calcium and/or magnesium; wherein the amino-monoalkylene phosphonic acid is amino-methylene phosphonic acid; wherein the amino-bis(alkylene-phosphonic) acid is amino-bis(methylene-phosphonic) acid; wherein the amino-tris(alkylene-phosphonic) acid is amino-tris(methylene-phosphonic) acid; and wherein the polyamino-poly(alkylene-phosphonic) acid is triamino-penta (methylene-phosphonic) acid.

5. A composition according to claim 1, wherein the acrylamide polymer is an acrylamide homopolymer or an acrylamide copolymer with one or more unsaturated copolymerizable monomers selected from the group consisting of acrylic acid, methacrylamide, sodium 2-acrylamido-2-methyl-propanesulfonate and N-vinyl-2-pyrrolidone, which polymer or copolymer is substantially non-hydrolysed or partially hydrolysed and has a molecular weight of from 100,000 to 20,000,000; and wherein the acrylamide polymer or copolymer is used in an amount of from 1,000 to 50,000 ppm when the water used in the gellable composition is fresh water or of from 15,000 to 30,000 ppm when the water used in the gellable composition is salt water.

6. A composition according to claim 5, wherein the molecular weight of the polymer or copolymer is from 200,000 to 12,000,000 and wherein the amount of acrylamide polymer or copolymer is from 5,000 to 10,000 ppm when fresh water is used in the gellable composition.

7. A composition according to claim 1, wherein the water-soluble aldehyde crosslinking agent is a monoaldehyde or a dialdehyde selected from the group consisting of formaldehyde, trioxane, paraformaldehyde, acetaldehyde, propionaldehyde, butyric aldehyde, isobutyric aldehyde, valeric aldehyde, heptaldehyde, decanal, glyoxal, glutaric aldehyde and terephthalaldehyde present in an amount of from 100 to 20,000 ppm.

8. A composition according to claim 7, wherein the crosslinking agent is present in an amount from 400 to 10,000 ppm.

9. A composition according to claim 1, wherein the crosslinking agent is the combination of the aldehyde and the phenol and wherein the phenol is a monohydroxy or di-hydroxy phenol selected from the group consisting of phenol, catechol, resorcinol, phloroglucinol, pyrogallol, 4,4'-diphenol and 1,3-dihydroxynaphthalene present in an amount of from 300 to 12,000 ppm, with a molar ratio of the aldehyde to the phenol being from 0.01:1 to 25:1.

10. A composition according to claim 9, wherein, in the combination of the aldehyde and the phenol crosslinking agent, the phenol is present in an amount of from 400–10,000 ppm and the molar ratio of the aldehyde to the phenol is from 0.5:1 to 6:1.

11. A composition according to claim 1, wherein the composition further comprises one or more stabilizing agent(s) for the acrylamide polymer or copolymer.

12. A composition according to claim 11, wherein the stabilizer is thiourea.

13. A composition according to claim 1, wherein the water contains divalent ions.

14. A composition according to claim 13, wherein the molar ratio of the water-soluble anti-syneresis agent to the divalent ions is from 0.4 to 4.

15. A composition according to claim 13, wherein, the ratio of the moles of the water-soluble anti-syneresis agent to the divalent ions is from 0.2 to 10 and wherein the molar concentration of the anti-syneresis agent is from 0.05M to 0.5M.

16. A composition according to claim 15, wherein the molar concentration is from 0.01 to 0.2M; wherein the molar ratio is from 6.4:1 to 0.3:1; and wherein the ratio of the aldehyde to the malonic acid is from 200:1 to 10:1.

* * * * *